Figure 1:
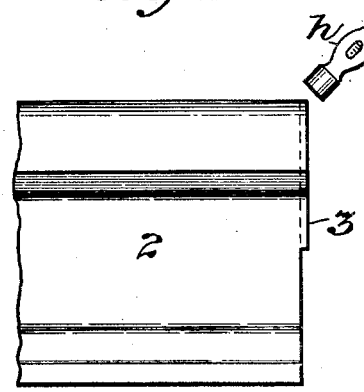

May 14, 1929. H. SCHULTZ 1,712,524

METHOD OF PREPARING SECTIONS FOR ALUMINOTHERMIC WELDING

Filed Feb. 18, 1928

INVENTOR
Hermann Schultz
BY
HIS ATTORNEY

Patented May 14, 1929.

1,712,524

UNITED STATES PATENT OFFICE.

HERMANN SCHULTZ, OF LANKWITZ, NEAR BERLIN, GERMANY.

METHOD OF PREPARING SECTIONS FOR ALUMINOTHERMIC WELDING.

Application filed February 18, 1928, Serial No. 255,305, and in Germany May 5, 1927.

The invention relates to a novel and useful method of preparing parts or sections of iron or steel for aluminothermic or similar welding through the agency of superheated molten metal poured into a mold in which the sections or parts to be welded are enclosed, with the adjacent faces of the sections or parts abutting an interposed shim or filler plate, usually of steel or iron, and the object of the invention is to effect a substantially gas-tight engagement between the abutting faces of the parts or sections and the interposed filler to protect such abutting faces from oxidation or other injury, such as would be occasioned by the impinging of the products of combustion from the gas flame or similar heating means commonly employed for preheating the mold and the parts to be welded.

In the so-called combination welding process heretofore employed, it is customary to cut the shims or fillers interposed between the faces of the parts to be welded somewhat larger than the cross sectional areas of the latter, so that the edges of the shims project beyond the profiles of the parts to be welded, the projecting edges being then hammered down until they overlap the adjacent edges of the parts, so that any gap or gaps between the ends of the parts and the shim or filler would be closed from the outside by the swaged edges of the shim or filler. This means for closing or luting the gap between the sections to be welded and the filler, is more or less satisfactory in welding parts of simple and regular cross sections, such as rods and bars, but involves much difficulty when attempted to be applied to parts of complex or involved cross sections, such as railway rails, girders, beams and the like, because of the practical impossibility of swaging or hammering the projecting edges of the shims or fillers around the entire profile of the part to produce a gas-tight seal or lute.

The present invention is designed to overcome this difficulty and provide an entirely satisfactory seal or luting joint between the faces of the parts to be welded and the abutting faces of the shim or filler, this end being accomplished by forming projecting rims about the marginal edges of the opposing faces of the sections, by swaging, hammering or otherwise upsetting the metal all around the marginal edges of the faces of the parts, said flanges being substantially perpendicular to the faces of the sections to be welded, so that, when said sections are forced into engagement with the interposed shim or filler, the preformed flanges or rims will be forced into penetrating engagement with the abutting faces of the shim or filler and constitute an effective seal or luting joint, which will completely exclude the products of combustion or other heating medium from contact with the engaging faces of the sections to be welded and of the filler or shim, so that no oxidation or other damaging effects to said faces will occur.

Because of the fact that the shims or filler plates are usually of softer metal than the parts to be welded, it is not necessary to form other than relatively light flanges or rims about the profile edges of the parts to be welded, as a flange or rim such as may be readily produced by hammer blows may be readily embedded in the abutting faces of the shim or filler plate and produce an effective gas-tight seal with the latter.

Figure 2:
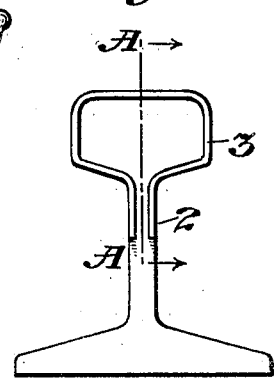
Figure 3:
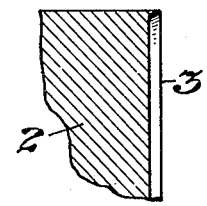
Figure 4:
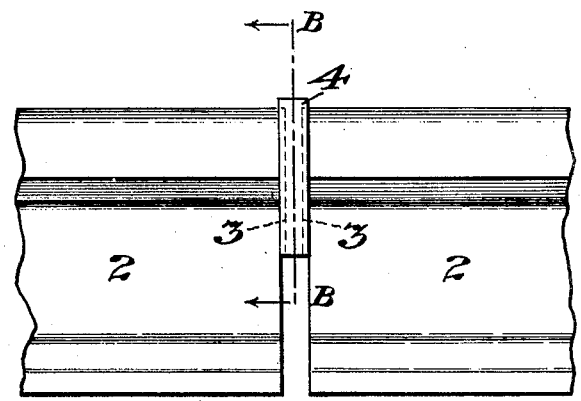
Figure 5:
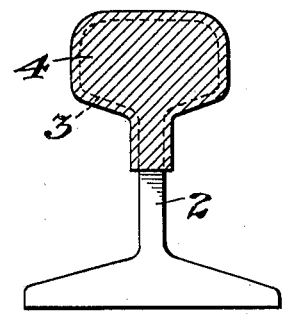

In the accompanying drawing, illustrating the practice of the invention as applied to the ends of a pair of railway rails to be welded together with an interposed shim or filler, Fig. 1 is a side elevation of the end of a railway rail provided with a projecting rim on its end face at the upper part thereof in accordance with the invention;

Fig. 2 an end view of the same;

Fig. 3 an enlarged sectional detail, the section being taken on the line A—A of Fig. 2;

Fig. 4 a side elevation of the ends of two rails with the projecting rims forced into penetrating engagement with an interposed shim or filler; and Fig. 5 a section on the line B—B of Fig. 4.

In the drawing, 2—2 indicates the rail ends, each having a projecting rim 3 about the marginal edge of its end face at the upper part thereof, and 4 indicates the interposed shim or filler into the abutting faces of which the rims 3 are forced into penetrating engagement, as shown in Fig. 4, whereby an effective seal or luting joint is formed, as and for the purpose hereinbefore described. The projecting rims may be formed by any suitable tool, such as the hammer indicated at $h$.

What I claim is:

1. The method of preparing sections for alumino-thermic welding which comprises forming projecting rims about the marginal edges of the opposing faces of the sections and forcing said rims into penetrating engagement with an interposing shim or filler plate.

2. The method of preparing sections for alumino-thermic welding which comprises upsetting the marginal edges of the opposing faces to form cutting rims substantially normal to said faces, and forcing said rims into penetrating engagement with an interposing shim or filler plate.

3. The method of preparing sections for alumino-thermic welding which comprises hammering the marginal edges of the opposing faces of the sections to form cutting rims substantially normal to said faces, and forcing said rims into penetrating engagement with an interposing shim or filler plate.

In testimony whereof I affix my signature.

HERMANN SCHULTZ.